3,551,113
SULFUR PRODUCTION

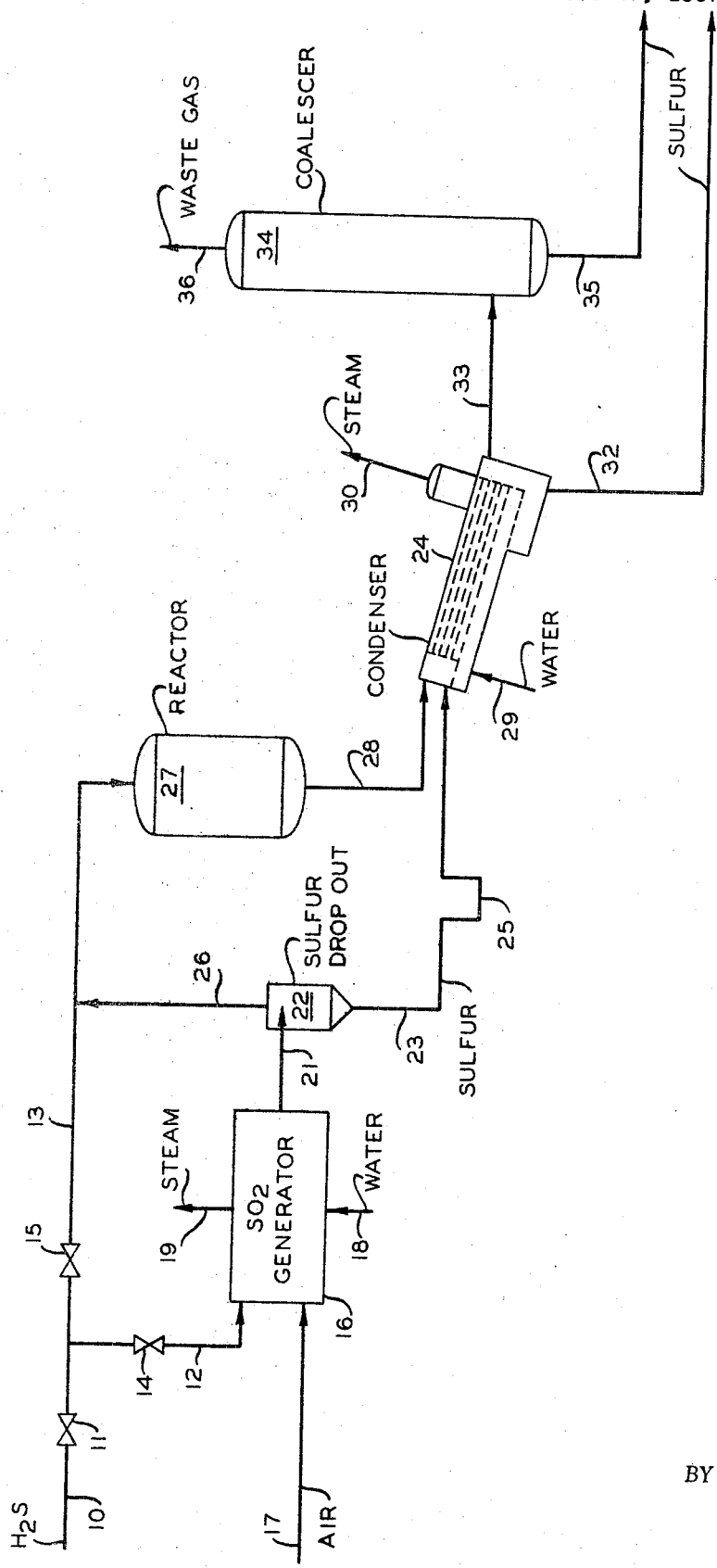

Jerrold G. Cash, Sweeny, Tex., assignor to Phillips Petroleum Company, a corporation of Delaware
Filed Nov. 27, 1967, Ser. No. 685,805
Int. Cl. C01b *17/04;* B01j *1/14*
U.S. Cl. 23—262                                                4 Claims

ABSTRACT OF THE DISCLOSURE

Sulfur is produced by dividing a hydrogen sulfide containing stream into two parts. One part is burned to produce sulfur dioxide, which is combined with the other part of the original stream and reacted to produce sulfur. Additional sulfur is recovered from the system by removing from the sulfur dioxide containing stream sulfur which is produced when the hydrogen sulfide stream is burned.

---

This invention relates to the production of sulfur from hydrogen sulfide containing streams.

It is common practice in the petroleum and chemical industries to manufacture sulfur from gaseous streams which contain hydrogen sulfide. One such procedure involves dividing the hydrogen sulfide containing stream into two streams in approximately a 2:1 ratio. The stream containing the smaller amount of hydrogen sulfide is oxidized to produce sulfur dioxide. This sulfur dioxide, together with the major stream of hydrogen sulfide, is passed through a catalyst bed to convert the reactants into sulfur and water vapor. The sulfur produced is recovered from the catalyst bed effluent by the use of condensing apparatus.

The present invention provides an improvement in sulfur producing processes of this type. It has been found that a certain amount of sulfur is formed when the hydrogen sulfide stream is oxidized to produce sulfur dioxide. In accordance with this invention, the sulfur so formed is removed from the sulfur dioxide containing stream. The sulfur so removed can advantageously be combined with the effluent gaseous stream from the reactor and recovered along with the sulfur produced in the reactor. The process of this invention results in the recovery of an increased amount of sulfur over that obtained by prior art methods of operation. This accomplishes both an economic gain in the amount of sulfur produced and a reduction in the amount of sulfur containing waste gases which must be disposed of in the plant.

Accordingly, it is an object of this invention to provide an improved process for the production of sulfur from hydrogen sulfide containing streams.

Another object is to provide apparatus for increasing the amount of sulfur recovered in sulfur producing operations.

Other objects, advantages and features of the invention should become apparent from the following detailed description in conjunction with the accompanying drawing which is a schematic representation of apparatus which can be employed to carry out the method of this invention.

Referring now to the drawing in detail, a gaseous feed stream containing hydrogen sulfide is introduced through an inlet conduit 10, which has a valve 11 therein. Conduit 10 communicates with conduits 12 and 13, which have respective valves 14 and 15 therein. These valves can be adjusted to regulate the relative flows of hydrogen sulfide. Conduit 12 communicates with the inlet of a sulfur dioxide generator 16. Air is introduced into generator 16 through a conduit 17. The hydrogen sulfide passed to generator 16 is oxidized to produce an effluent stream which contains sulfur dioxide and water vapor as the primary reaction products. This exothermic reaction is cooled by the generation of stream within sulfur dioxide generator 16. To this end, water is introduced through a conduit 18, and the resulting steam is removed through a conduit 19.

The effluent from generator 16 is removed through a conduit 21 which is connected to the inlet of a sulfur drop out vessel 22. This vessel, which can advantageously be a cyclone separator, is provided for the purpose of removing sulfur from the gaseous effluent stream from generator 16. Although a cyclone separator is particularly effective for this purpose, other types of vessels can be used wherein the direction of the effluent stream is suddenly changed to drop out the sulfur. The sulfur so removed is withdrawn through a conduit 23 which communicates with the inlet of a condenser 24. Conduit 23 is provided with a trap 25 which prevents the flow of any vapor from the condenser back to the drop out vessel. If necessary, conduit 23 can be steam traced to prevent sulfur from solidifying in the line.

The effluent vapor from drop out vessel 22 is passed through a conduit 26 to conduit 13, the latter communicating with the inlet of a reactor 27. Reactor 27 contains a suitable catalyst which is employed to convert hydrogen sulfide and sulfur dioxide into sulfur and water vapor. Bauxite is conventionally employed for this purpose. The effluent from reactor 27 is directed through a conduit 28 to the inlet of condenser 24.

Water is introduced into condenser 24 through a conduit 29 for the purpose of cooling the effluent vapors from reactor 27. This water passes in indirect heat exchange relationship with the vapors, and the resulting steam produced is withdrawn through a conduit 30. A portion of the sulfur contained in the reactor effluent vapors is condensed and removed through a conduit 32. The remaining vapors are withdrawn from condenser 24 through a conduit 33 which communicates with the inlet of a coalescer 34. Additional sulfur is withdrawn from the bottom of the coalescer through a conduit 35. The residual waste gas stream is removed through a conduit 36 and directed to an incinerator or other waste gas disposing means, not shown.

In a specific example of the operation of the improved process of this invention, a hydrogen sulfide stream is introduced through conduit 10 at a temperature of approximately 110° F. and a pressure of approximately 5 p.s.i.g. The compositions and flow rates of the principal components through the various conduits are set forth in the following table:

[Conduit (Pounds/hour)]

| Component | 12 | 17 | 26 | 13 | 28 | 23 | 32 | 35 | 36 |
|---|---|---|---|---|---|---|---|---|---|
| $H_2S$ | 1,050 | | 50 | 2,000 | 297 | | | | 297 |
| $O_2$ | | 1,343 | | | | | | | |
| $N_2$ | | 4,700 | 4,700 | | 4,700 | | | | 4,700 |
| $SO_2$ | | 1,743 | | | 93 | | | | 93 |
| $H_2O$ | | | 530 | | 1,459 | | | | 1,459 |
| Sulfur | | | 6 | | 2,480 | 64 | 2,059 | 470 | 15 |

The 6 pounds/hour of sulfur in conduit 26 is present as a vapor. In this example the system is operated such that the effluent from generator 16 is at a temperature of approximately 550° F. and at a pressure of approximately 0.5 p.s.i.g. The gaseous stream introduced into reactor 27 is at a temperature of approximately 450° F. and at a pressure of approximately 0.4 p.s.i.g. The effluent stream removed from reactor 27 is at a temperature of approximately 750° F., and the effluent stream 33 removed from condenser 24 is at a temperature of approximately 300° F. It can be seen from the foregoing example that some 64 pounds of sulfur per hour are removed by knock down vessel 22. This results in the total production of some 2,529 pounds of sulfur per hour.

In order to demonstrate the improved operation by this invention, the following table represents flow rates and compositions which result from a corresponding system in which knock down vessel 22 is removed and the entire effluent from generator 16 is passed to reactor 27.

[Conduit (Pounds/hour)]

| Component | 12 | 17 | 26 | 13 | 28 | 32 | 35 | 36 |
|---|---|---|---|---|---|---|---|---|
| $H_2S$ | 1,050 | | 50 | 2,000 | 343 | | | 343 |
| $O_2$ | | 1,343 | | | | | | |
| $N_2$ | | 4,700 | 4,700 | | 4,700 | | | 4,700 |
| $SO_2$ | | | 1,743 | | 137 | | | 137 |
| $H_2O$ | | | 530 | | 1,433 | | | 1,433 |
| Sulfur | | | 70 | | 2,480 | 2,007 | 458 | 15 |

It can be seen from the foregoing heat and material balances that there is no appreciable change in temperature of the effluent stream from the generator 16 on passing through vessel 22.

In this example, the total amount of sulfur recovered is some 64 pounds per hour, or 1,536 pounds per day, less than is recovered by the present invention under identical conditions. The present invention thus provides a significant increase in the amount of sulfur that can be recovered. There is also a corresponding reduction in the amount of hydrogen sulfide and sulfur dioxide in the waste gas from the system. This reduces the amount of atmospheric pollution and/or the amount of further treatment required on the waste gas effluent stream.

While this invention has been described in conjunction with a presently preferred embodiment, it should be evident that it is not limited thereto.

What is claimed is:

1. In a system for producing sulfur by means of a combustion chamber having a cooling means associated therewith through which a heat removal fluid can be circulated, a reactor containing a catalyst to promote the reaction of hydrogen sulfide with sulfur dioxide to produce sulfur, first conduit means communicating with said combustion chamber to introduce a hydrogen sulfide containing stream, means to introduce an oxygen containing gas into said combustion chamber, second conduit means communicating with said reactor to introduce a hydrogen sulfide containing gas, and third conduit means communicating between said combustion chamber and said reactor to pass the effluent from said combustion chamber to said reactor; apparatus for increasing sulfur production comprising a liquid drop out vessel disposed in said third conduit means at a region spaced from said combustion chamber and associated cooling means to remove sulfur from the effluent from said combustion chamber, said vessel being of such configuration that the temperature of the effluent stream from the combustion zone is not changed appreciably in passing through the vessel.

2. The apparatus of claim 1 wherein said vessel is a cyclone separator.

3. The apparatus of claim 2, further comprising a condenser, fourth conduit means communicating between said reactor and said condenser to pass the effluent from said reactor to the inlet of said condenser, and fifth conduit means communicating between said vessel and said condenser to pass sulfur to the inlet of said condenser.

4. The apparatus of claim 3 wherein said fifth conduit means is provided with a trap to block vapor flow.

References Cited

UNITED STATES PATENTS

| | | | |
|---|---|---|---|
| 2,168,150 | 8/1939 | Baehr et al. | 23—225XR |
| 2,785,056 | 3/1957 | Thumm et al. | 23—225 |
| 2,834,655 | 5/1958 | Chute et al. | 23—262XR |
| 2,919,976 | 1/1960 | Feagan | 23—225 |
| 2,945,748 | 7/1960 | Magill | 23—262XR |
| 2,958,586 | 11/1960 | Barber | 23—225 |
| 3,057,698 | 10/1962 | Grekel et al. (II) | 23—262 |
| 3,399,970 | 9/1968 | Grekel et al. (I) | 23—225 |
| 3,407,040 | 10/1968 | Kunkel | 23—225 |
| 2,403,451 | 6/1946 | Nevins | 23—225 |

JOSEPH SCOVRONEK, Primary Examiner

D. G. MILLMAN, Assistant Examiner

U.S. Cl. X.R.

23—226